US010306900B2

(12) United States Patent
Mach et al.

(10) Patent No.: US 10,306,900 B2
(45) Date of Patent: Jun. 4, 2019

(54) APPARATUS FOR EQUIPPING A FILLING TUBE AND RELATED EQUIPPING METHOD

(71) Applicant: VEMAG Maschinenbau GmbH, Verden/Aller (DE)

(72) Inventors: Matthias Mach, Hannover (DE); Jan-Nils Hagedorn, Verden (DE); Heiner Matthies, Kalbe (DE); Olaf Grote, Eystrup (DE); Alexander Lewin, Verden (DE)

(73) Assignee: VEMAG Maschinenbau GmbH, Verden/Aller (DE)

( * ) Notice: Subject to any disclaimer, the term of this patent is extended or adjusted under 35 U.S.C. 154(b) by 0 days.

(21) Appl. No.: 16/115,966

(22) Filed: Aug. 29, 2018

(65) Prior Publication Data

US 2019/0059401 A1 Feb. 28, 2019

(30) Foreign Application Priority Data

Aug. 31, 2017 (DE) .................. 10 2017 120 098

(51) Int. Cl.
*A22C 11/00* (2006.01)
*A22C 11/02* (2006.01)

(52) U.S. Cl.
CPC ...... *A22C 11/0227* (2013.01); *A22C 11/0209* (2013.01); *A22C 11/0245* (2013.01)

(58) Field of Classification Search
CPC ....... A22C 11/00; A22C 11/008; A22C 11/02; A22C 11/0218; A22C 11/0227
USPC ................ 452/30–32, 35–37, 46–48, 51
See application file for complete search history.

(56) References Cited

U.S. PATENT DOCUMENTS

| 4,577,370 A | * | 3/1986 | Kollross | .............. A22C 11/02 452/22 |
| 5,297,983 A | * | 3/1994 | Mueller | ............ A22C 11/0236 452/25 |
| 6,139,416 A | * | 10/2000 | Topfer | .................. A22C 11/02 452/31 |

(Continued)

FOREIGN PATENT DOCUMENTS

| DE | 102008026095 A1 | 12/2008 |
| EP | 0110343 A1 | 6/1984 |
| EP | 1570740 A1 | 9/2005 |

(Continued)

OTHER PUBLICATIONS

German Patent Office, Office Action in DE 10 2017 120 098.3 issued Jan. 22, 2019 (6 pages).

(Continued)

*Primary Examiner* — Richard T Price, Jr.
(74) *Attorney, Agent, or Firm* — Wood Herron & Evans LLP (57) ABSTRACT

An equipping apparatus for and method of equipping a filling tube is provided. The equipping apparatus includes a feed device for feeding a gathered tubular case to a case gripping device, and a case gripping device having gripping elements for gripping and orienting a gathered tubular case. The equipping apparatus further includes a pushing-on member moveable axially relative to a filling tube longitudinal axis for pushing the case on to a filling tube. A detecting device is associated with the gripping elements for sensing the position of at least one of the gripping elements.

16 Claims, 8 Drawing Sheets

(56) References Cited

U.S. PATENT DOCUMENTS 7,666,071 B2    2/2010   Nakamura et al.
8,827,774 B2 *   9/2014   Bilowski .............. A22C 11/008
                                                            452/35

FOREIGN PATENT DOCUMENTS

| EP | 2384634 A2 | 11/2011 |
| EP | 3075251 A1 | 10/2016 |
| WO | 2004032638 A1 | 4/2004 |

OTHER PUBLICATIONS

European Patent Office, Search Report issued in EP 18191964.8-1011 dated Jan. 21, 2019 (8 pages).

* cited by examiner

APPARATUS FOR EQUIPPING A FILLING TUBE AND RELATED EQUIPPING METHOD

CROSS-REFERENCE TO RELATED APPLICATION

This application and claims priority to German Application No. 10 2017 120 098.3, filed Aug. 31, 2017. The above-mentioned patent application is incorporated herein by reference in its entirety.

TECHNICAL FIELD

The invention relates to an apparatus for equipping a filling tube with a gathered tubular case. The invention further relates to a method of equipping a filling tube with a gathered tubular case.

BACKGROUND

Apparatuses for and methods of equipping a filling tube, in particular with a gathered tubular case, are known in the state of the art. Apparatuses are previously known for industrial sausage production, in which a tubular case to be filled is applied to a filling tube in an automated procedure in a gathered state (also referred to as a gathered sausage skin casing or shined sausage skin). Sausage meat then issues at the open end of the filling tube and is delivered into the tubular case which has been applied to the filling tube. By portion-wise closure of the cases, for example by portion-wise twisting relative to each other or by other measures, the continuous line of cases is separated into individual sausages after having been filled with sausage meat.

To accelerate the production process the state of the art discloses filling apparatuses in which a plurality of and in particular two filling tubes are arranged on a main body which is rotatable parallel to the longitudinal axis of the filling tube and which has a receiving portion, the receiving portion being rotatable in a rotary turret-like fashion together with the filling tubes. By such an arrangement, the filling tube is equipped with a gathered tubular case and the actual case filling operation is performed in different operating positions.

The step of applying the gathered tubular case to the filling tube in a so-called equipping position is further automated in apparatuses which are previously known from the state of the art. Thus, it is previously known for the gathered tubular cases to be removed from a magazine by magazine sliders and then positioned by the grippers in front of the filling tube in such a way that the case can be pushed on to the filling tube, in particular by a pushing-on member.

After the sausage skin casing has been pushed on to the filling tube, the latter is rotated into a filling position. Filling of the gathered tubular cases is conducted in that filling position.

The apparatuses previously known from the state of the art make it possible to apply gathered tubular cases to filling tubes in an automated procedure. It will be noted however that there is the disadvantage in the described state of the art that defective loading of the gripping device with a case can be only inadequately detected. In addition, the previously known apparatuses are not capable of ascertaining the diameter of the cases used (sausage skin casings). On the contrary, the sausage skin casing diameter is to be adjusted by the operator, and that represents a potential source of error. In addition, in the apparatuses known in the state of the art the maximum length of the filling tubes and thus the maximum case length that can be processed are limited.

With that background in mind, it would be desirable to develop an apparatus and a method that overcomes the disadvantages encountered in the state of the art as described above. In particular, it would be desirable to provide an apparatus for equipping a filling tube and a related method, which overall increase the production process reliability, relieve stress on the installation operator, and permit the use of cases of differing lengths.

SUMMARY

According to one embodiment of the invention, these technical objects are attained by having the equipping device include a detecting device associated with the gripping elements, in particular for sensing the position of at least one of the gripping elements. Furthermore, according to one embodiment of a method under this invention, these technical objectives are attained by the steps: opening an upper and/or a lower gripping element of a case gripping device; feeding a gathered tubular case to the lower gripping element; closing the gripping elements of the upper gripping element; sensing the position of at least one gripping element; and ascertaining the diameter of the fed case on the basis of the sensed position of the gripping element or elements.

In one aspect, the detecting device permits sensing of the position of the gripping elements, which is particularly relevant for the filling tube equipping process. On the basis of knowledge of the position of the gripping elements, in particular when they are in a state in which the upper gripping element and the lower gripping element are in contact with the case, it is possible to arrive at conclusions about the diameter of the case, defective loading of the gripping elements and the like. In addition, the knowledge of further parameters to be sensed like for example closure forces of the gripping elements and the like makes it possible to obtain more in-depth information about fault-free and defective equipping procedures.

In another aspect, the detecting device has at least one rotary encoder for sensing the position of at least one of the gripping elements. The use of such a rotary encoder for ascertaining the position of the gripping elements makes it possible for the sensor to be arranged in such a way that it is not to be disposed in the immediate proximity of the foodstuffs to be processed, but in a protected situation, in particular in a position of being enclosed in a housing. Impairment of the sensor function due to possible impurities and contamination which can result from the production process is thereby avoided.

Additionally or alternatively, the gripping elements have a drive having a rotor, wherein the drive is adapted to communicate the position of the rotor to the detecting device. In that case the detecting device is in a sense integrated in the drive. That makes it possible overall to reduce the structural space involved and also to ensure reliable delimitation in relation to the region of the apparatus, in which foodstuffs are being processed.

In some embodiments, the detecting device has an optical sensor for sensing the position of the gripping elements. In dependence on the indicated situation of use, the use of such an optical sensor either in the context of sole use thereof or in combination with further sensors can be appropriate to obtain additional items of information about the equipping process, to check signals produced by other sensors, or to provide a redundant sensor arrangement.

In another aspect, the detecting device is a force sensor adapted to ascertain the forces occurring at the gripping elements. Such a force sensor is suitable for providing information going beyond the positioning of the gripping elements. In particular, the step of ascertaining closure forces of the grippers is particularly suitable for detecting incorrect loading of the gripping elements. Alternatively or additionally, such a force sensor can also be associated with the pushing-on member which serves to push the case on to the filling tube. Sensing the force required for pushing the case on to the filling tube also makes it possible to derive information which indicates whether the case is correctly or defectively pushed on to the filling tube.

In a further aspect, the apparatus has a control device which is coupled to the detecting device and which is adapted at least to determine the case diameter. Such a control device serves to transform the sensor data (for example date in relation to the position of the gripping elements or forces occurring upon closure of the gripping elements) into information which can be used in many different ways. For example, the control device makes it possible to determine the diameter of the case accommodated by the gripping device from the position of the upper gripping element and the position of the lower gripping element.

In one aspect, a gripping element or the gripping elements are adapted to portion-wise encircle the filling tube. Such portion-wise encirclement of the filling tube leads to support thereof. Overall it is thus possible to use longer filling tubes, which in turn makes it possible to process longer cases. Such a design configuration and arrangement of the gripping elements also promotes guided pushing movement of the cases on to the filling tube and thus reduces the risk of defective pushing-on procedures. As soon as the case has been applied to the filling tube in the operation of fitting it thereon the gripping elements (being transmitted by the case) take over a centering and support function for the filling tube. During application of the case the gripping elements support and guide the case and the case in turn supports and centers the filling tube.

In another aspect, the gripping elements have a recess along their longitudinal axis for centering and orienting a case. In that way the case is overall reliably positioned in the center of the grippers and held in position there and it is also possible to compensate for slight bending and deformation of the case so that the case can be pushed on to the filling tube in centered and straight relationship. It is further preferred for the recess to be of a V-shaped configuration with respect to a transverse axis of the gripping elements. Such a V-shape has proven to be particularly suitable for reliably centering the case and compensating for irregularities and deformations thereof.

In yet another aspect, the pushing-on member is adapted by the movement of the pushing-on member when pushing a case on to the filling tube to remove impurities from the gripping elements. As a result, the gripping elements are cleaned in each operation of pulling the sausage skin on to the filling tube itself as the case to be pushed on to the tube also carries away possible impurities (sausage meat residues) on the gripping elements. This therefore ensures that reliable gripping and centering of the case is not restricted by virtue of contaminating impurities on the gripping elements. These various aspects and embodiments can be combined in any combination, so long as the equipping apparatus achieves the technical advantages described above.

Referring now to another embodiment of the invention, the method of equipping a filling tube further has the step: orienting and centering the case relative to the axial direction of a filling tube, wherein the gripping elements portion-wise encircle the filling tube, partially opening the gripping elements; and pushing the case in a guided manner onto the filling tube by pushing-on member. These method steps provide that while the case is being pushed on to the filling tube the filling tube is supported by the case and the gripping elements acting on the case. At the same time the case is pushed on to the filling tube in guided relationship. Overall this therefore makes it possible to use longer filling tubes by virtue of the support action. At the same time this reduces the probability that the cases are prevented from being defectively pushed on to the filling tube.

In one aspect, the method also includes the steps: closing the gripping elements until they come into portion-wise contact with the filling tube; sensing the position of at least one of the gripping elements; and ascertaining the diameter of the filling tube on the basis of the sensed position of the gripping element or elements.

If consequently the state is one in which there is no case on the gripping elements, the gripping elements can be used to determine the diameter of the filling tube in an automated procedure. That serves when using different filling tube diameters to overall enhance the process reliability, such that it is possible to check to what extent a filling tube of a correct diameter suited to the case diameter is being used.

In another aspect, the method includes the following steps: detecting defective loading of a case gripping device, in particular when: no case is put into the case gripping device, or a plurality of cases have been engaged by the case gripping device, or a case is defectively put into the case gripping device, or the case diameter differs from a predefined case diameter. The detection of defective loading of the case gripping device can be used in particular to stop the apparatus in the event of detected incorrect loading immediately in order to ensure that no wastage is produced. In that case the error state is overall detected very quickly, whereby machine stoppage times are reduced. These various aspects and embodiments can be combined in any combination, so long as the equipping method achieves the technical advantages described above.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitutes a part of this specification, illustrate one or more embodiments of the invention and, together with the general description given above and the detailed description given below, explain the one or more embodiments of the invention.

DETAILED DESCRIPTION

Figure 1:
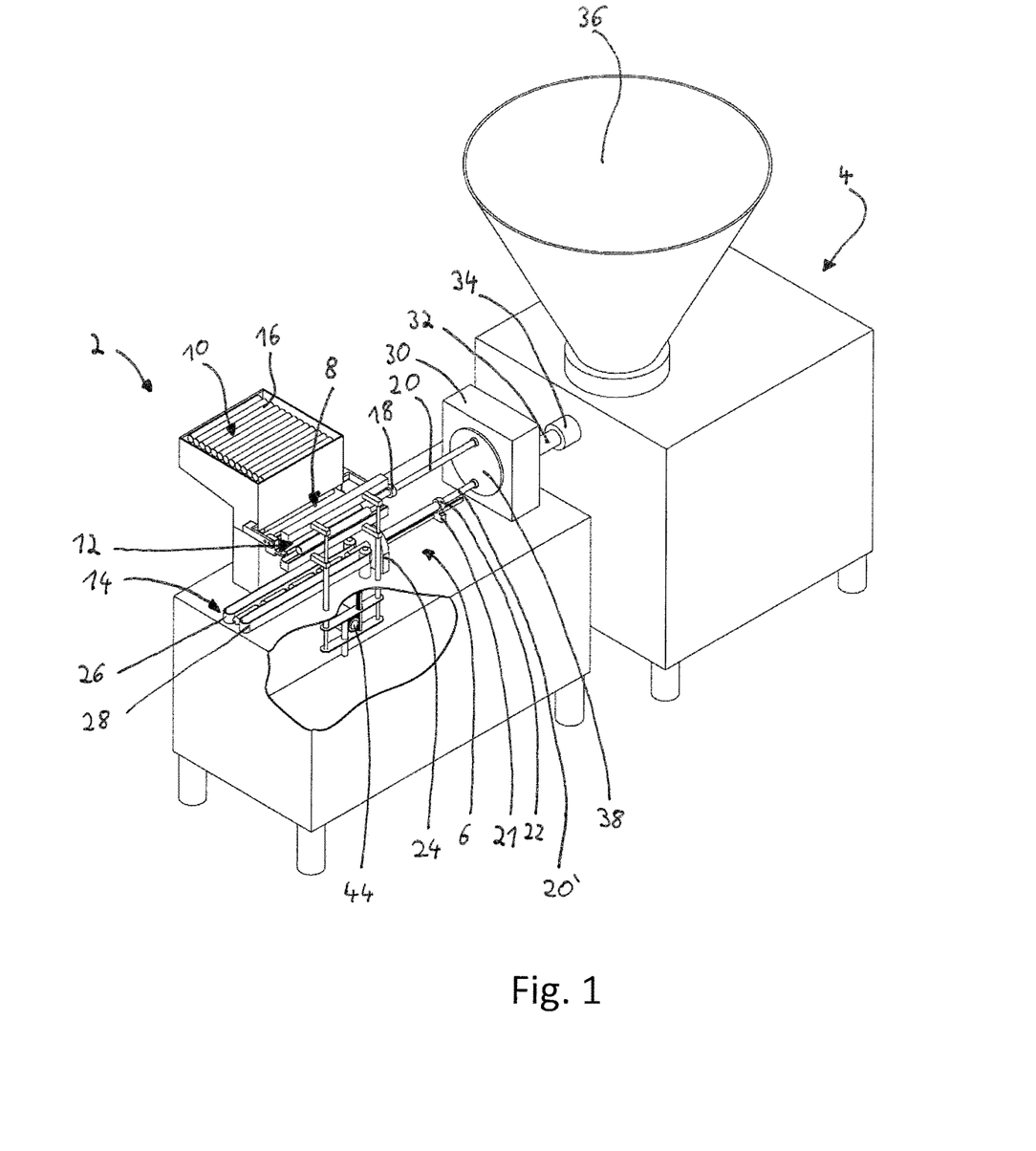
FIG. 1 shows a perspective view of a machine for filling tubular cases including an equipping apparatus according to one embodiment of the invention.

FIG. 1 shows a filling machine 4 for filling tubular cases 16, in particular artificial or natural sausage casings, in conjunction with an attachment 2 at which a filling apparatus 6 and a filling tube equipping apparatus 8 are arranged. The machine 4 further has a filling hopper 36 and an extrusion head 34 which are coupled in material-conducting relationship to a twisting-off head 30 of the apparatus 6 by way of a delivery tube 32.

The filling tube equipping apparatus 8 includes a case magazine 10 for accommodating a plurality of tubular cases 16 and a case gripping device 12. In addition, arranged at the attachment 2 is a conveyor device 14 having two conveyor elements 28 and 28' extending at a spacing relative to each other in a horizontal plane (see FIG. 4). The conveyor device 14 serves to transport the sausages 26 produced by the filling apparatus 6.

The filling apparatus 6 serves to fill the tubular cases 16 by the pasty material conveyed by the extrusion head 34. The twisting-off head 30 has a receiving portion 38 which is rotatably mounted in a rotary turret-like fashion for receiving two filling tubes 20, 20' which are respectively in turn arranged rotatably and in a drivable manner on the receiving portion 38. The rotatable receiving portion 38 has an axis of rotation extending in the horizontal plane. The axis of rotation of the receiving portion 38 which is in the form of a pivotal plate and the axis of rotation of the filling tubes 20, 20' extend parallel to each other. In addition, the axes of rotation of the filling tubes 20, 20' are arranged spaced uniformly from the axis of rotation of the receiving portion 38. That permits a simplified change of the filling tubes 20, 20' between the positions on the filling apparatus 6. A tubular case 16 is pushed on to the filling tube 20 in the upper position, the so-called equipping position, while filling of a tubular case 16 which has been pushed on to the filling tube 20' is conducted preferably at the same time on the filling tube 20' in the lower position, the so-called filling position.

Associated with the filling tube 20 arranged in the upper equipping position is the filling tube equipping apparatus 8 with its case gripping device 12. The case gripping device 12 includes two gripping elements which are mounted moveably relative to each other, an upper gripping element 42 and a lower gripping element 42' (see FIG. 4), with which a tubular case 16 is taken over from the case magazine 10. The case 16 is at least held in the case gripping device 12. The gripping elements 42, 42' are driven by the gripper drive 44.

Figure 2:
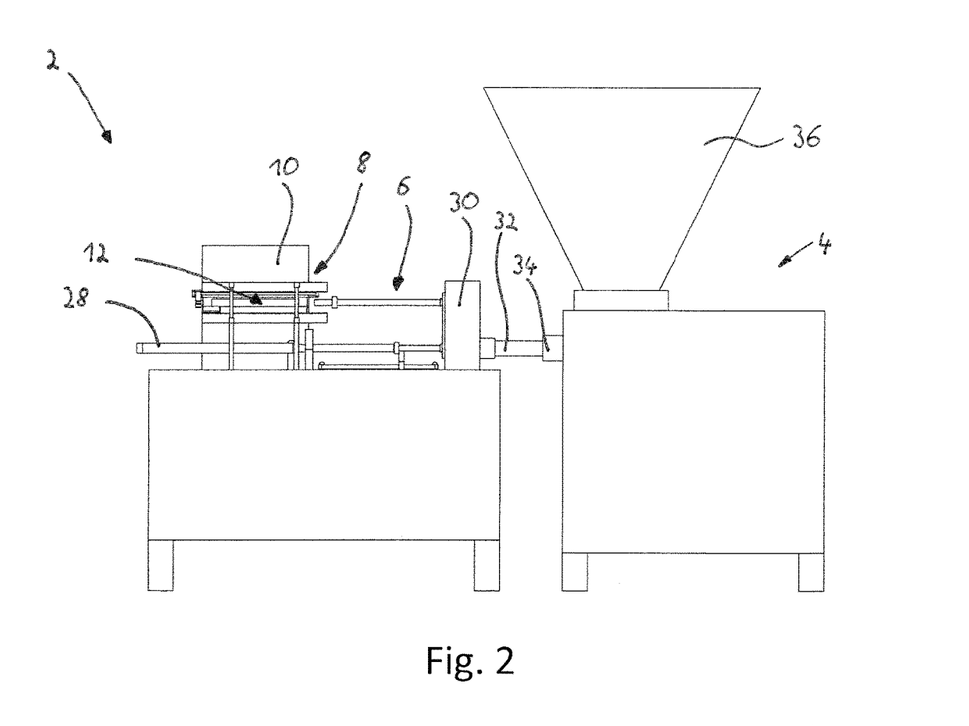
FIG. 2 shows a side view of the filling machine and the equipping apparatus of FIG. 1.
Figure 3:
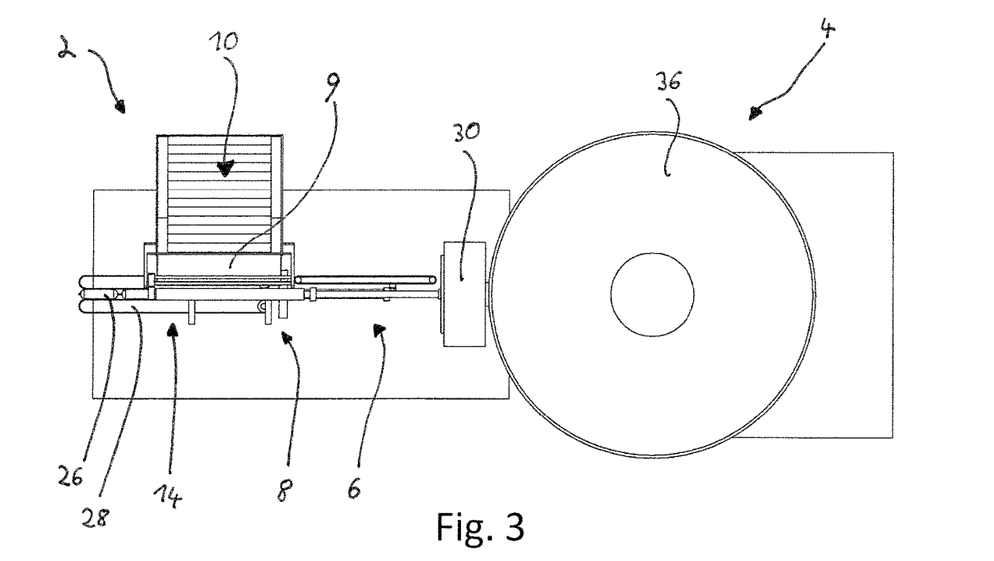
FIG. 3 shows a plan view of the filling machine and the equipping apparatus of FIG. 1.

Associated with the filling tube 20' arranged in the filling position is a casing braking system 24, also referred to as the case braking system, which in particular provides that the case 16 which has been pulled on to the filling tube 20' is straightened out of its gathered condition during filling thereof and is thus delivered from the filling tube 20' in controlled fashion. At the same time the braking system 24 ensures that the case 16 which has still remained on the filling tube 20' is rotated together with the filling tube 20' about its axis of rotation during the step of twisting off the case 16 and producing a twist-off location between two successive portions of a string of sausages 26 to be produced. FIGS. 2 and 3 show a side view and a plan view respectively of the filling apparatus of FIG. 1.

Figure 4:
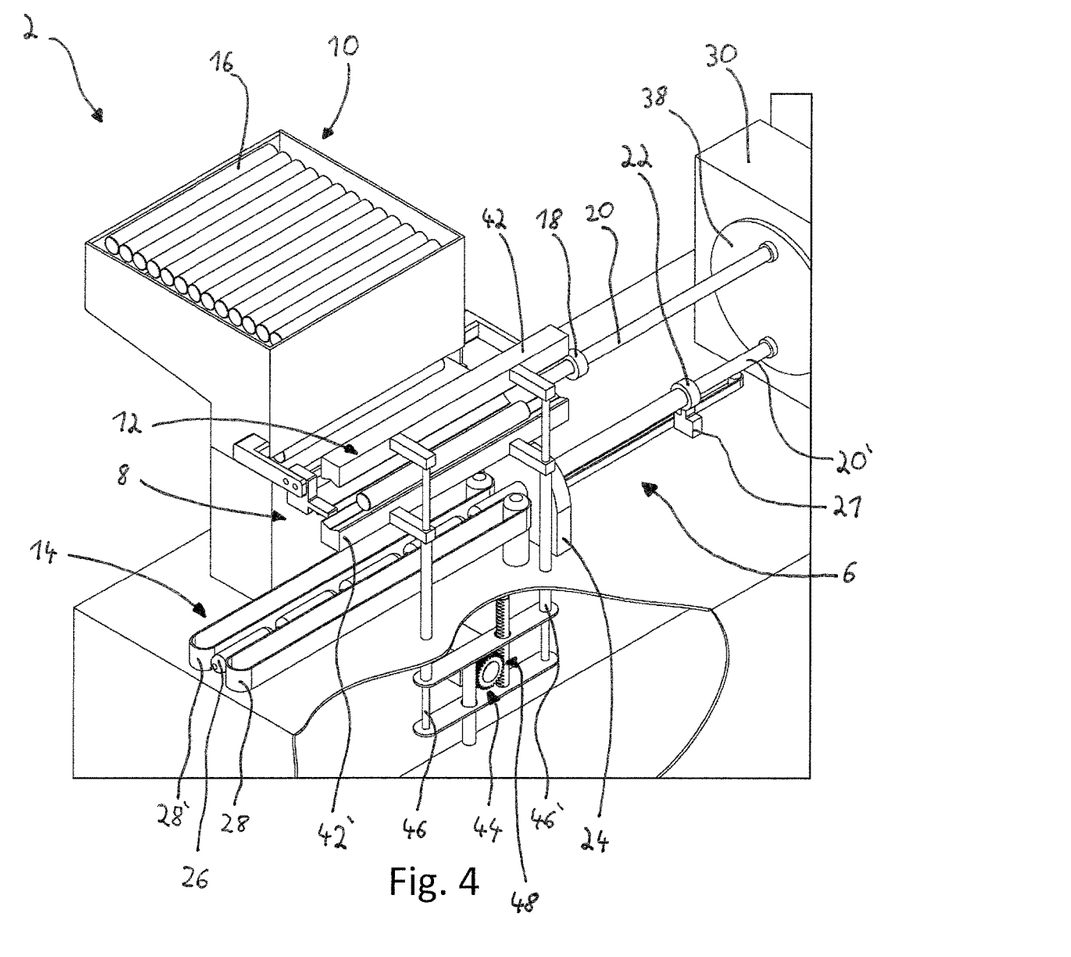
FIG. 4 shows a perspective view of an enlarged portion of the equipping apparatus of FIG. 1 and a filling apparatus for filling tubular cases.

FIG. 4 shows the case gripping device 12 in greater detail. The case gripping device 12 has an upper gripping element 42 and a lower gripping element 42' which are pivotably connected by way of gripper linkages 46, 46'. Individually separated cases 16 from the case magazine 10 are fed to the case gripping device 12, in particular the lower gripping element 42'. After a case 16 has been fed to the lower gripping element 42' the gripping elements 42, 42' are closed until the upper gripping element 42 comes into contact with the case. By virtue of the case 16 being encircled by the gripping elements 42, 42' the case is centered and any possible deformation is at least partially compensated. The gripping elements 42, 42' further surround the filling tube 20. As however the diameter of the cases 16 is greater than the diameter of the filling tube 20 the gripping elements 42, 42' do not come into direct contact with the filling tube 20. After orientation of the case 16 axially relative to the filling tube 20 the gripping elements 42, 42' are slightly opened so that the pushing-on member 40 can push the case 16 on to the filling tube 20 in the axial direction. During the pushing-on movement the gripping elements 42, 42' support and guide the case 16 and the case 16 in turn supports and centers the filling tube 20. The entrainment ring 18 is also advanced by the movement of the case 16 as it is pushed on to the filling tube 20. The gripping elements 42, 42' are actuated by way of the gripper linkages 46, 46'. The gripper drive 44 in turn acts on the gripper linkages 46, 46'. That gripper drive 44 is adapted in particular to provide that the gripping elements 42, 42' are moved in such a way that a case 16 is positioned irrespective of its diameter centrally with respect to the filling tube 20.

A detecting device 48 is arranged at the gripper drive 44. That detecting device 48 senses in particular the position of the gripping elements 42, 42' as well as the forces occurring in operation of the gripping elements 42, 42'. In this case the detecting device 48 can be directly associated with the gripper drive 44, for example in the form of a feedback of the position of the rotor of such a gripper drive 44, or the detecting device can be adapted to ascertain position and forces occurring in respect of the gripping elements 42, 42' directly at the gripping elements 42, 42' or at the gripper linkages 46, 46'.

The filling tube 20 is in a filling position in the operative state illustrated in FIG. 4. However, no case 16 has been applied to the filling tube 20' in FIG. 4. An entrainment ring 22 is arranged on the filling tube 20'. That entrainment ring 22 is displaceable in the axial direction by the casing pushing member 21. The pushing member 21 can be actuated for example by actuators. In operation it is thus possible for the case 16 to be further pushed during filling thereof in the direction of the casing braking system 24. Such further pushing movement is advantageous as the gathered tubular case 16 loses its gathered condition and is processed during the filling operation.

Figure 5:
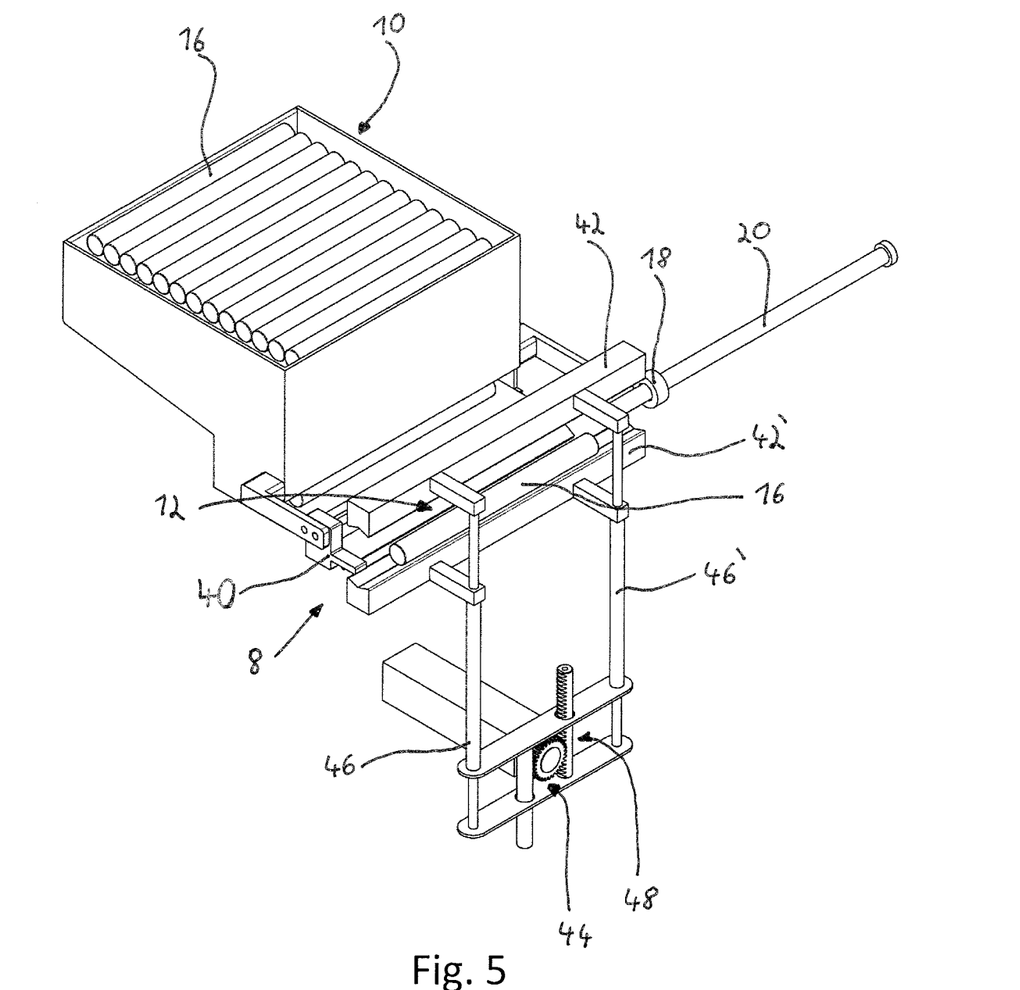
FIG. 5 shows a perspective view of portions of the equipping apparatus of FIG. 1 during a step in a method of equipping per one embodiment of the invention.

FIGS. 5 through 8 show the equipping apparatus during the sequence of successive method steps. In FIG. 5 firstly a case 16 moves out of the case magazine 10 on to the lower gripping element 42'. The gripping elements 42, 42' are disposed in an opened state. In addition, the entrainment ring 18 is disposed in a position near the open end of the filling tube 20.

Figure 6:
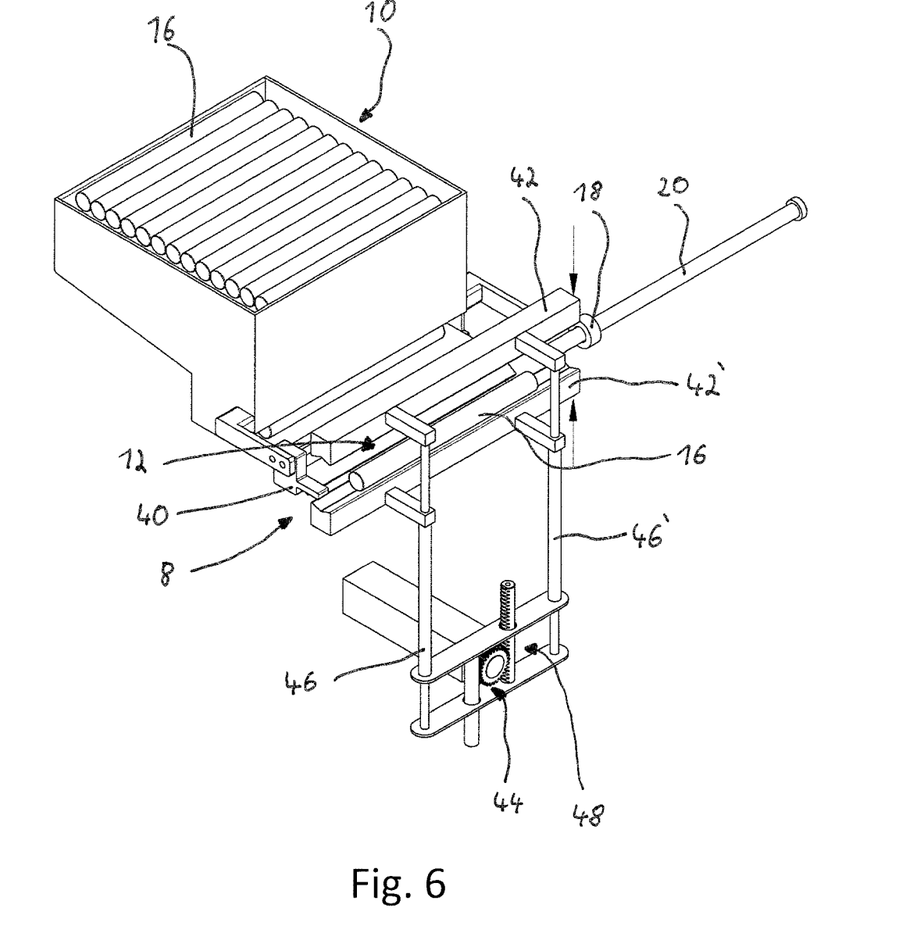
FIG. 6 shows a perspective view of portions of the equipping apparatus of FIG. 1 in a successive method step after that shown in FIG. 5.

In the method step illustrated in FIG. 6 the gripping elements 42, 42' are closed by the gripper linkages 46, 46' and the gripper drive 44.

The detecting device 48 senses the position of the gripping elements 42, 42' and the closure forces which occur. If the case 16 were defectively arranged for example on the lower gripping element 42' or if for example there were to be a plurality of cases 16 on the lower gripping elements 42' it would then be conceivable that for example the force required to close the gripping elements 42, 42' would be increased without the gripping elements 42, 42' being closed to such an extent as would be expected for the case diameter being used. In such a case defective loading of the gripping elements 42, 42' could be detected on the basis of the data sensed by the detecting device 48.

Figure 7:
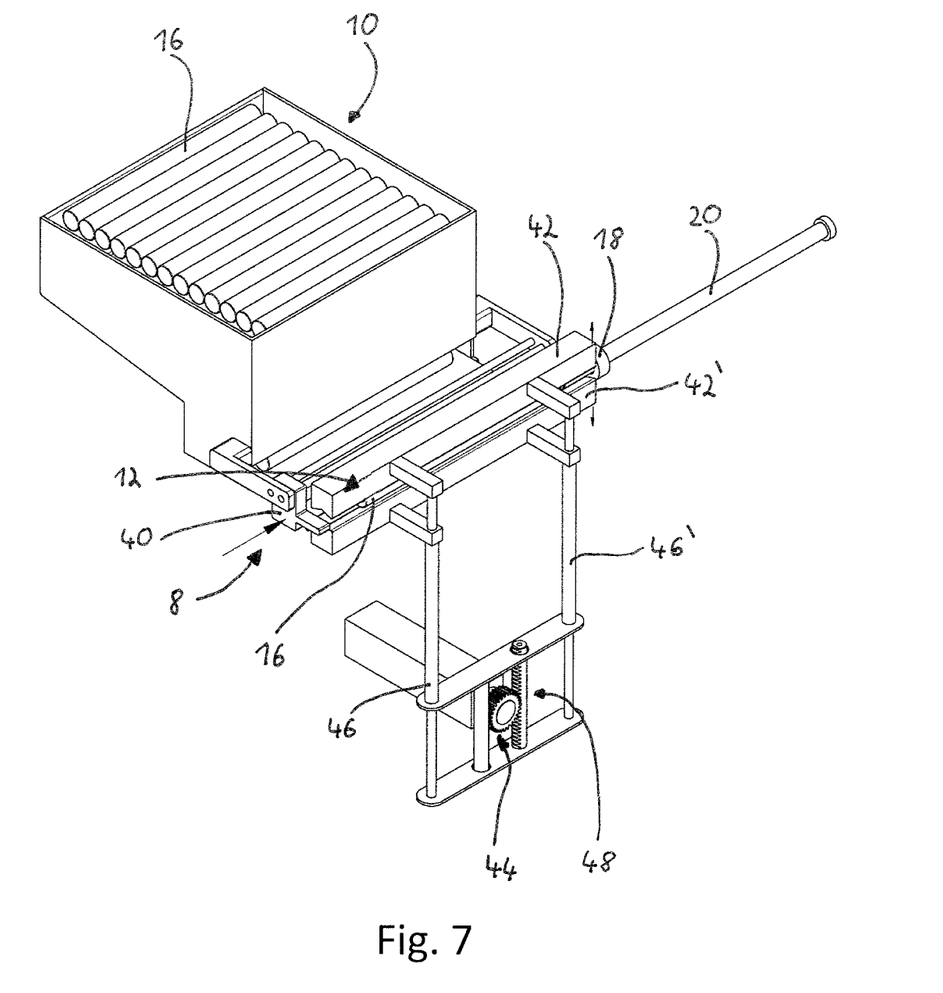
FIG. 7 shows a perspective view of portions of the equipping apparatus of FIG. 1 in a successive method step after that shown in FIG. 6.

Referring now to FIG. 7 shown therein is a method step in which the gripping elements 42, 42' now encircle the case 16. The case 16 is now centered in front of the filling tube 20. The gripping elements 42, 42' are now opened by the gripper drive 44 and by the gripper linkages 46, 46' to such an extent that the case 16 is admittedly still guided by the gripping elements 42, 42', but is no longer held fast thereby. The pushing-on member 40 pushes the case 16 on to the filling tube 20 and so-to-speak pushes the entrainment ring 18 by the case 16 on to the filling tube 20. The gripping elements 42, 42' support and guide the case 16, with the case 16 in turn supporting and centering the filling tube 20.

Figure 8:
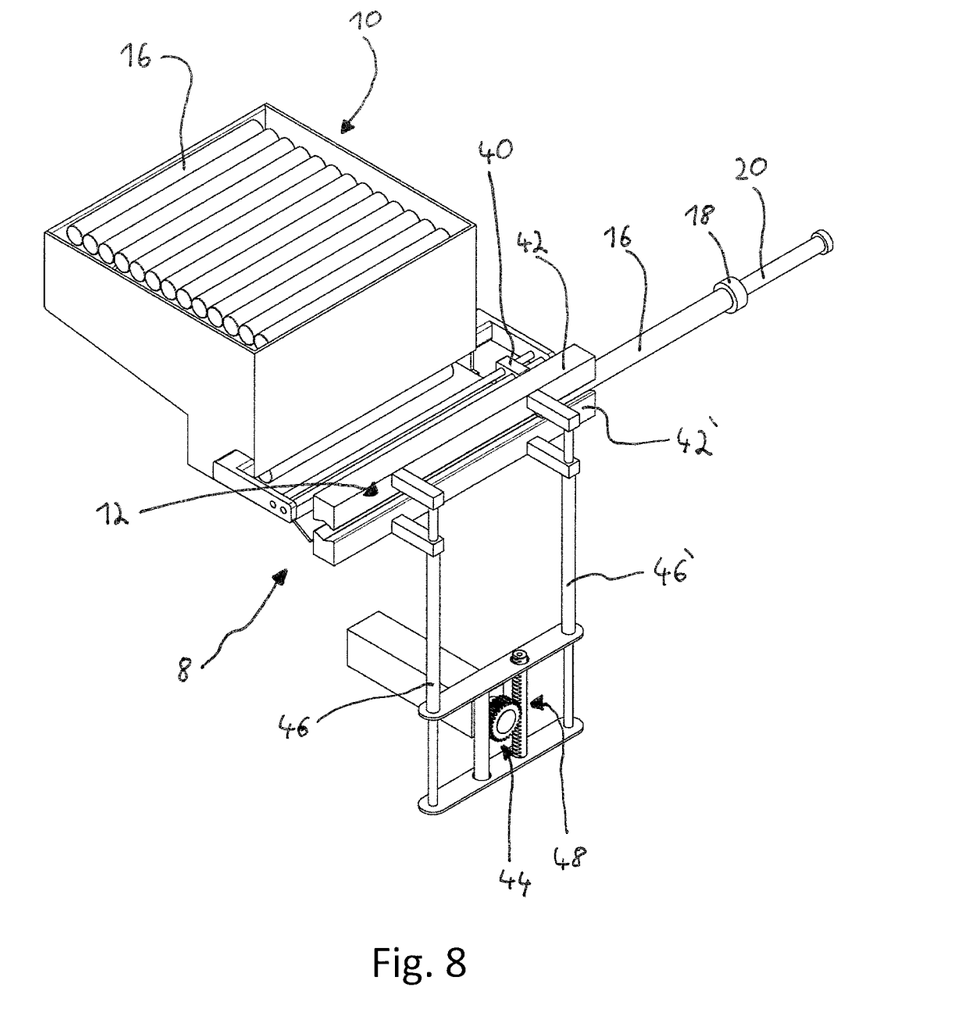
FIG. 8 shows a perspective view of portions of the equipping apparatus of FIG. 1 in a successive method step after that shown in FIG. 7.

FIG. 8 shows that state in which the case 16 has been almost completely pushed on to the filling tube 20. Here the pushing-on member 40 is near its final position. The pushing-on member 40 can also be connected to a detecting device (not shown in the Figure). In this case the forces required in the pushing-on operation allow conclusions as to how far the case 16 has been fault-free pushed on to the filling tube 20. If, for example, the case 16 tilts while it is being pushed on, then typically the force required to push it on to the tube increases. In addition, it is conceivable that the detecting device 48 detects an opening force in relation to the gripping elements 42, 42' while the case 16 is being pushed on to the filling tube 20 if the case 16 tilts or the like while being pushed on. Thus, sensing of the position and the operating forces of the gripping elements 42, 42' and the pushing-on member 40 allow conclusions to be drawn about an error-free or defective equipping process for the filling tube 20.

Figure 9:
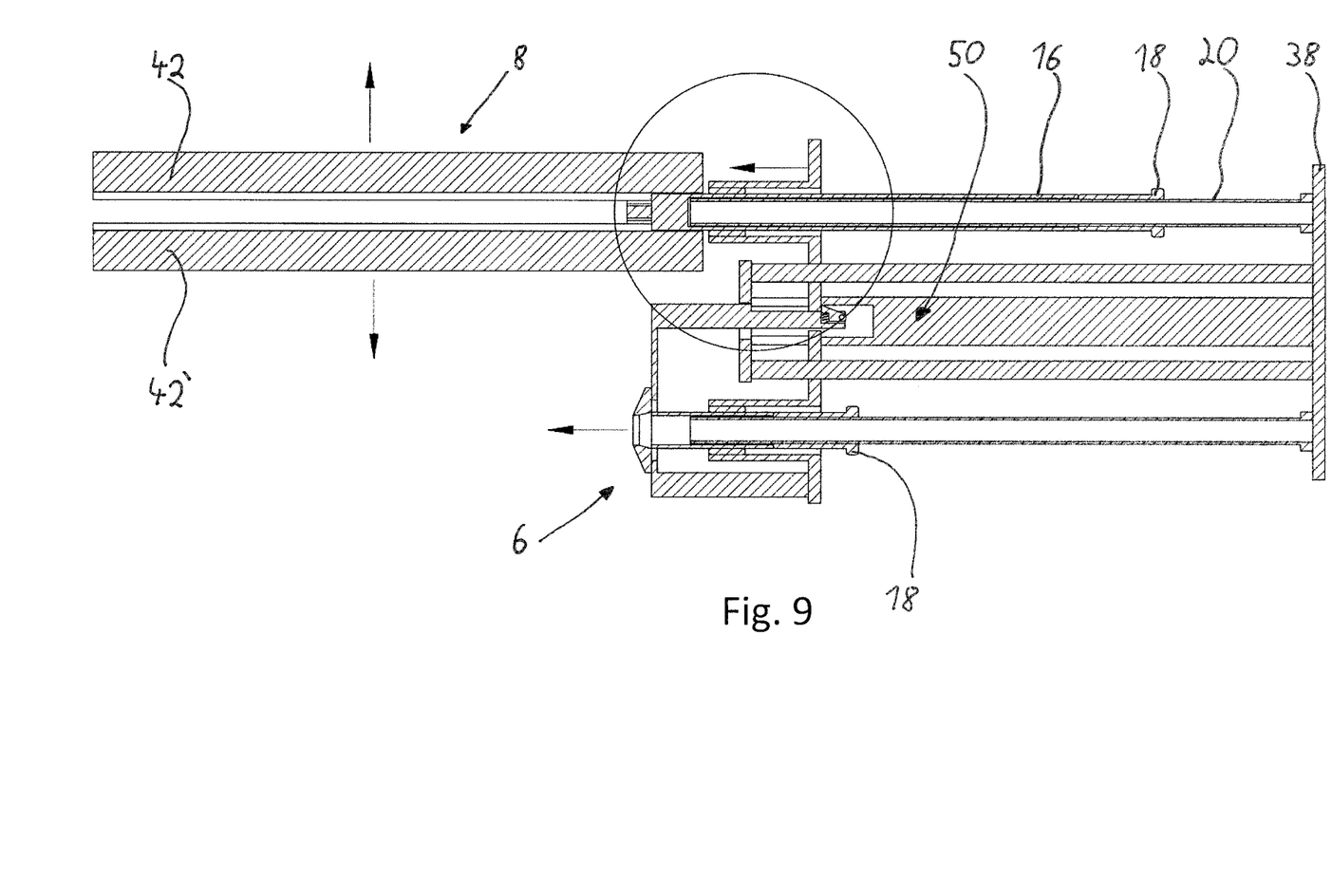
FIG. 9 shows a sectional view of a machine for filling tubular cases having an equipping apparatus according to another embodiment of the invention.

FIG. 9 shows an alternative embodiment of a machine for filling tubular cases as a sectional view. The machine has a support unit 50 (not shown in greater detail). As can be seen from the Figure the gripping elements 42, 42' embrace the case 16. The case 16 is centered and any deformation is at least partially compensated. The gripping elements 42, 42' also at least indirectly encircle the filling tube 20. As however the diameter of the cases 16 is greater than the diameter of the filling tube 20 the gripping elements 42, 42' do not come into direct contact with the filling tube 20. While a case 16 is being applied to the filling tube 20 the gripping elements 42, 42' support and guide the case 16 and the case 16 in turn support and centers the filling tube 20.

The embodiments described above are only descriptions of preferred embodiments of the present invention, and do not intended to limit the scope of the present invention. Various variations and modifications can be made to the technical solution of the present invention by those of ordinary skills in the art, without departing from the design and spirit of the present invention. The variations and modifications should all fall within the claimed scope defined by the claims of the present invention.

LIST OF REFERENCES USED 2 attachment
4 machine
6 filling apparatus
8 filling tube equipping apparatus
9 feed device
10 case magazine
12 case gripping device
14 conveyor device
16 case
18 entrainment ring
20, 20' filling tube
21 casing pushing member
22 entrainment ring
24 casing braking system
26 sausage
28, 28' conveyor element
30 twisting-off head
32 delivery tube
34 extrusion head
36 filling hopper
38 receiving portion
40 pushing-on member
42 upper gripping element
42' lower gripping element
44 gripper drive
46, 46' gripper linkages
48 detecting device
50 support unit

What is claimed is:

1. An equipping apparatus for equipping a filling tube with a gathered tubular case, comprising:
   a feed device for feeding a gathered tubular case to a case gripping device;
   a case gripping device having gripping elements for gripping and orienting a gathered tubular case;
   a pushing-on member that is moveable axially relative to a filling tube longitudinal axis for pushing the case on to a filling tube; and
   a detecting device associated with the gripping elements for sensing a position of at least one of the gripping elements.

2. The equipping apparatus of claim 1, wherein the detecting device has at least one rotary encoder for sensing the position of at least one of the gripping elements.

3. The equipping apparatus of claim 1, wherein the gripping elements have a drive having a rotor, wherein the drive is adapted to communicate the position of the rotor to the detecting device.

4. The equipping apparatus of claim 1, wherein the detecting device has an optical sensor for sensing the position of the gripping elements.

5. The equipping apparatus of claim 1, wherein the detecting device is a force sensor adapted for ascertaining the forces occurring at the gripping elements.

6. The equipping apparatus of claim 1, further comprising:
   a control device which is coupled to the detecting device and which is adapted to determine a case diameter of the case.

7. The equipping apparatus of claim 1, wherein one or more of the gripping elements are adapted to portion-wise encircle the filling tube.

8. The equipping apparatus of claim 1, wherein the gripping elements have a recess along their longitudinal axes for centering and orienting a case.

9. The equipping apparatus of claim 8, wherein the recess is of a V-shaped configuration with respect to a transverse axis of the gripping elements.

10. The equipping apparatus of claim 1, wherein the pushing-on member is adapted by movement of the pushing-on member when pushing a case onto the filling tube to remove impurities from the gripping elements.

11. The equipping apparatus of claim 1, wherein:
the detecting device has at least one rotary encoder for sensing the position of at least one of the gripping elements;
the gripping elements have a drive having a rotor, wherein the drive is adapted to communicate the position of the rotor to the detecting device;
the detecting device has an optical sensor for sensing the position of the gripping elements;
the detecting device is a force sensor adapted for ascertaining the forces occurring at the gripping elements;
the equipping apparatus further comprises a control device which is coupled to the detecting device and which is adapted to determine a case diameter of the case;
one or more of the gripping elements are adapted to portion-wise encircle the filling tube;
the gripping elements have a recess along their longitudinal axes for centering and orienting a case;
the recess is of a V-shaped configuration with respect to a transverse axis of the gripping elements; and
the pushing-on member is adapted by movement of the pushing-on member when pushing a case on to the filling tube to remove impurities from the gripping elements.

12. A method of equipping a filling tube with a gathered tubular case, comprising the steps:
opening an upper gripping element and/or a lower gripping element of a case gripping device;
feeding a gathered tubular case to the lower gripping element;
closing the upper and lower gripping elements until the upper gripping element contacts the case;
sensing a position of at least one of the gripping elements; and
ascertaining a diameter of the case based on the sensed position of the at least one of the gripping elements.

13. The method of claim 12, further comprising:
orienting and centering the case relative to an axial direction of a filling tube, wherein the gripping elements encircle the filling tube in a portion-wise manner;
partially opening the gripping elements; and
pushing the case in a guided manner onto the filling tube by a pushing-on member.

14. The method of claim 13, further comprising:
closing the gripping elements until they come into at least portion-wise contact with the filling tube;
sensing a position of at least one of the gripping elements; and
ascertaining a diameter of the filling tube based on the sensed position of the at least one of the gripping elements.

15. The method of claim 14, further comprising:
detecting defective loading of a case gripping device, when one of the following occurs:
no case is put into the case gripping device,
a plurality of cases has been engaged by the case gripping device,
a case is defectively put into the case gripping, and
the case diameter differs from a predefined case diameter.

16. The method of claim 12, further comprising:
detecting defective loading of a case gripping device, when one of the following occurs:
no case is put into the case gripping device,
a plurality of cases has been engaged by the case gripping device,
a case is defectively put into the case gripping, and
the case diameter differs from a predefined case diameter.

* * * * *

UNITED STATES PATENT AND TRADEMARK OFFICE
CERTIFICATE OF CORRECTION

| | |
|---|---|
| PATENT NO. | : 10,306,900 B2 |
| APPLICATION NO. | : 16/115966 |
| DATED | : June 4, 2019 |
| INVENTOR(S) | : Matthias Mach et al. |

It is certified that error appears in the above-identified patent and that said Letters Patent is hereby corrected as shown below:

On the Title Page

Column 2, item (57) ABSTRACT, Line 2, reads "filling tube is provided. The equipping apparatus includes a" and should read -- filling tube are provided. The equipping apparatus includes a --.

In the Specification

Column 1, Line 7, reads "This application and claims priority to German Applica-" and should read -- This application claims priority to German Applica- --.

Column 2, Line 4, reads "develop an apparatus and a method that overcomes the" and should read -- develop an apparatus and a method that overcome the --.

Column 3, Line 18, reads "example date in relation to the position of the gripping" and should read -- example, data in relation to the position of the gripping --.

Column 4, Line 50, reads "ings, which are incorporated in and constitutes a part of this" and should read -- ings, which are incorporated in and constitute a part of this --.

Column 5, Line 41, reads "a pivotal plate and the axis of rotation of the filling tubes 20," and should read -- a pivotal plate and the axes of rotation of the filling tubes 20, --.

Column 7, Line 61, reads "the case 16 in turn support and centers the filling tube 20." and should read -- the case 16 in turn supports and centers the filling tube 20. --.

Column 7, Line 63, reads "of preferred embodiments of the present invention, and do" and should read -- of preferred embodiments of the present invention, and are --.

Signed and Sealed this
Sixth Day of August, 2019

Andrei Iancu
*Director of the United States Patent and Trademark Office*

CERTIFICATE OF CORRECTION (continued)
U.S. Pat. No. 10,306,900 B2

In the Claims

At Claim 15, Column 10, Line 31, reads "a case is defectively put into the case gripping, and" and should read -- a case is defectively put into the case gripping device, and --.

At Claim 16, Column 10, Line 40, reads "a case is defectively put into the case gripping, and" and should read -- a case is defectively put into the case gripping device, and --.